United States Patent Office 3,455,406
Patented July 15, 1969

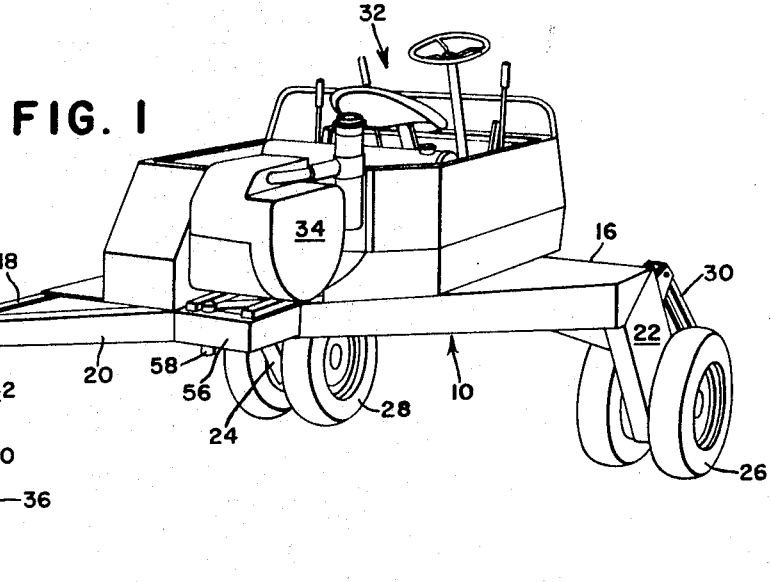
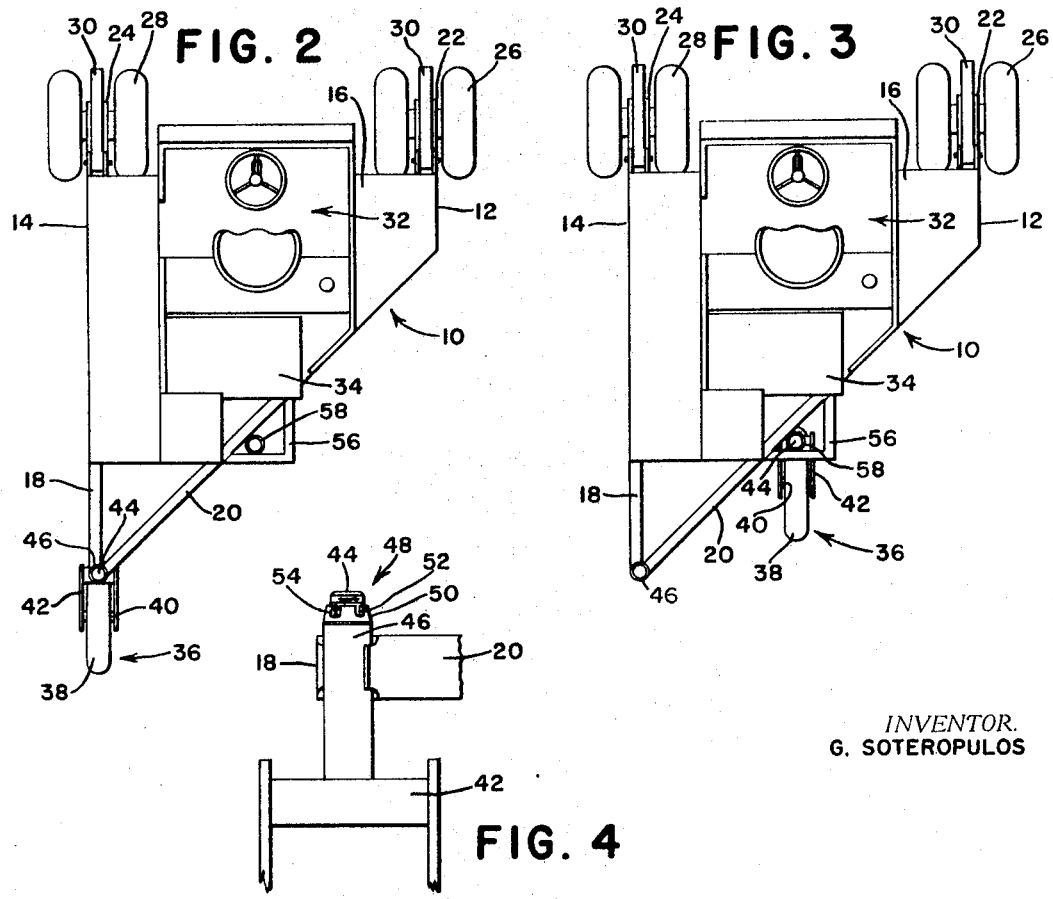
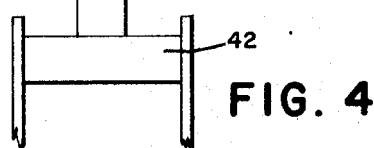

3,455,406
AGRICULTURAL MACHINE WITH ALTERNATE
CASTER WHEEL POSITIONS
Gust Soteropulos, Ottumwa, Iowa, assignor to Deere &
Company, Moline, Ill., a corporation of Delaware
Filed Oct. 11, 1967, Ser. No. 674,591
Int. Cl. B62d 61/08; A01d 73/00, 75/26
U.S. Cl. 180—27                             2 Claims

ABSTRACT OF THE DISCLOSURE

A traction unit for a self-propelled windrower or the like having a right triangular main frame with a transverse forward portion supported on right and left forward drive wheels, a fore-and-aft side portion, and a diagonal brace member, the rearward part of the frame being supported on a single caster wheel alternately mounted at the rearward end of the fore-an-aft side portion in fore-and-aft alignment with the left drive wheel or on the diagonal brace member on the fore-and-aft center line of the traction unit.

Background of the invention

This invention relates to a traction unit for a self-propelled harvesting machine, such as a windrower or the like.

A typical self-propelled windrower includes a traction unit having a forward operator's station, an engine behind the operator's station, a pair of forward drive wheels disposed at opposite sides of the traction unit, and a rearward caster wheel for supporting the rearward portion of the traction unit. The traction unit conventionally carries a forwardly disposed, transversely elongated, detachable harvesting header or platform, which cuts the crop as the machine advances, converges it toward the center of the platform, and discharges it rearwardly in a windrow between the drive wheels of the traction unit. In order that the rearward caster wheel does not run over the windrowed crop, the caster wheel is conventionally mounted at the side of the machine in line with one of the drive wheels, so that the drive wheels and the caster wheel are disposed in a generally right triangular relationship, the frame of the traction unit generally having the same triangular configuration.

Since the operator's station is generally centrally located on the forward part of the machine to afford good operator visibility, the engine is generally located rearwardly on the frame above the diagonal or hypotenuse portion of the frame. When the traction unit is carrying the forwardly disposed header, the center of gravity of the entire machine is forward, near the transversely spaced drive wheels. However, when the header is detached from the traction unit for transport of the machine or the like, the center of gravity becomes the center of gravity of the traction unit alone, and, since the rearward engine is relatively heavy, the center of gravity is far enough to the rear to make the traction unit relatively unstable. Thus, when the caster wheel is on the left side of the machine in alignment with the left drive wheel, as is conventional, the center of gravity approaches the line between the caster wheel and right drive wheel so that the caster wheel and the right drive wheel support most of the weight of the machine. If the left drive wheel then strikes a bump or similar obstruction, creating an upward force on the left drive wheel, the traction unit would tend to tip rearwardly about the right drive wheel and the caster wheel. Even if the traction unit does not tip, the reduced amount of weight carried by the left drive wheel decreases the traction for said wheel.

Of course, one solution to the stability problem would be to provide a rectangular frame with two rear caster wheels trailing the respective drive wheels. However, this solution increases the cost of the machine and further causes one of the caster wheels to pass over the windrowed crop when the machine turns a corner.

Summary of the invention

According to the present invention, alternate mounting locations are provided for the caster wheel, one location being provided at the side of the machine, in line with the drive wheel, for use during normal operation of the machine with the header attached, and the alternate location being provided proximate to the fore-and-aft center line of the machine for use when the header is detached, providing a conventional tricycle relationship between the drive wheels and caster wheel. Also according to the invention, the alternate means for mounting the caster wheel are of simple but rugged construction and the mounting means are such that the location of the caster wheel can be simply changed in a relatively short time by one man using normally available tools. Also, aside from the safety and increased traction provided by the alternate mounting means when the traction unit is operated without the header, conventional tricycle configuration permits the traction unit to be adapted for other uses, such as a draft vehicle, or wielding forwardly disposed tools, such as a scraper blade or loader bucket, in place of the conventional header.

Brief description of the drawings

FIG. 1 is a right rear perspective of a windrower traction unit embodying the invention with the caster wheel in operating position.

FIG. 2 is a somewhat schematic plan view of the traction unit with the caster wheel in operating position.

FIG. 3 is a view similar to FIG. 2 but with the caster wheel mounted in transport position.

FIG. 4 is an enlarged, fragmentary, rear elevation view of the rearward end of the traction unit, showing the details of the caster wheel mounting on the traction unit.

Description of the preferred embodiment

The invention is embodied in a windrower traction unit having a generally right triangular main frame 10 with right and left lateral sides 12 and 14 respectively, the main frame being on a generally horizontal plane. The terms "right" and "left" as well as such terms as "forward" and "rearward" are with reference to a person facing the direction of machine travel during normal operation of the machine, said direction being upwardly in FIGS. 2 and 3 of the drawings. It is to be understood that such terms as well as such terms as "fore-and-aft," "upwardly," "downwardly," etc., are words of convenience used to more clearly describe the invention.

The main frame has a transverse forward portion 16, a fore-and-aft beam or member 18 along its left side, and a beam-type diagonal member 20 along its rearward end between the opposite lateral sides of the machine, the front portion 16 and the left side member 18 forming the legs of the right triangular frame and the diagonal member 20 forming the hypotenuse.

Depending from and extending slightly forwardly from the opposite ends of the front portion 16 are right and left wheel support structures 22 and 24 respectively, which respectively journaled right and left drive wheels 26 and 28, the drive wheels 26 and 28 being shown as dual wheels in the illustrated embodiment, although single drive wheels are also frequently used in machines of this type.

As is well known in the art, the traction unit carries a forwardly disposed transversely elongated harvesting header or platform during operation in the field, the header being omitted from the drawings since its general configuration is well known. The header is conventionally carried for vertical adjustment by the traction unit on a parallel-type lifting mechanism extending forwardly from the traction unit, only the upper lift links 30 of the mechanism being shown in the drawings.

Centrally mounted on top of the main frame 10 is a forwardly disposed operator's station, indicated in its entirety by the numeral 32, the operator's station being located above the front portion 16 of the frame to afford the operator adequate visibility. An internal combustion engine 34 is mounted on the frame rearwardly of the operator's station, the engine being principally supported on the diagonal member 20 and a transverse brace member (not shown) beneath the engine and extending between the diagonal member and the left side member 18.

The rearward end of the frame is supported above the ground on a caster wheel structure, indicated in its entirety by the numeral 36, and including a single caster wheel 38 mounted on a horizontal axle 40 carried between the opposite arms of a yoke 42 to which an upright shaft 44 is attached, the arms of the yoke 42 being canted rearwardly relative to the axis of the shaft 44. The shaft 44 is insertable into an axially vertical tubular member or socket 46 having substantially the same inner diameter as the diameter of the shaft, the tubular member 46 being rigidly attached to the rearward end of the main frame 10 at the juncture of the members 18 and 20 by welding or the like.

As is apparent from FIGS. 2 and 3, the tubular member 46 is in fore-and-aft alignment with the left drive wheels 28, and, for normal operation of the machine, the caster wheel structure is mounted on the main frame via the member 46, so that the caster wheel follows the same path as the left drive wheels 28 during straight-ahead operation of the machine. The shaft 44 is freely swingable in the tubular member 46, so that the caster wheel is freely swingable about the vertical axis in the conventional manner.

The caster wheel structure is vertically locked in the tubular member by a locking device 48, the detailed construction of which is best seen in FIG. 4. The locking device 48 includes an annular cap 50, having an axial bore adapted to receive the shaft 44 and coaxially mounted on top of the member 46. The cap 50 is provided with a number of diametral grooves 52 of varying depths, and the shaft 44 is provided with a diametral bore, which is alignable with a groove 52 when the shaft 44 is completely inserted through the tubular member 46. A removable roll pin 54 is then insertable through the shaft bore, and its opposite ends engage the groove in the cap to prevent axial separation of the shaft 44 from the member 46. The varying depths of the grooves 52 provide an adjustment, which prevents excessive axial play of the shaft in the member 46, the adjustment being accomplished by turning the cap 50 to align the shaft bore with a groove which tightly engages the roll pin.

Projecting rearwardly and transversely from the diagonal member 20 is a right angle support bracket 56 having a fore-and-aft leg, the forward end of which is attached to the member 20, and a transverse leg, the left-hand end of which is also attached to the member 20, the bracket 56 serving to partially support the engine 34 as shown in FIG. 1. An alternate tubular member 58, similar to the tubular member 46 is rigidly attached, by welding or the like, to the diagonal frame member 20 and the transverse leg of the bracket 56, the member 58 being located midway between the opposite sides 12 and 14 on the fore-and-aft center line of the machine. The shaft 44 of the caster wheel structure 36 is mountable in the tubular member 58 in the same manner as in the tubular member 46, the locking device 48 being adapted to lock the shaft 44 in the tubular member 58 in the same manner as previously described.

In normal operation of the machine, with the header attached, the caster wheel structure is mounted in the member 46 as shown in FIG. 2. When the header is attached, it is positioned forwardly of the drive wheels 26 and 28 so that it counterbalances much of the weight of the traction unit, the center of gravity of the entire machine being relatively close to the axis of the drive wheels.

However, when the header is detached, a greater portion of the weight is carried by the caster wheel structure 36, the center of gravity shifting rearwardly on the traction unit. Thus, when the machine is being transported with the header detached, it is relatively unstable. To stabilize the traction unit, the caster wheel structure 36 is then moved to its transport position, as shown in FIG. 3. The wheel structure is easily shifted to its alternate position by elevating or jacking up the rearward end of the machine, removing the roll pin 54 so that the shaft 44 drops out of the member 46 and then moving the caster wheel structure to its alternate position, inserting the shaft 44 in the member 58 and thereafter installing the cap 52 and pin 54 to lock the wheel structure in place. The machine can similarly be reconverted to its normal operating condition after the header is attached.

I claim:

1. A traction unit for a self-propelled agricultural machine adapted to carry a detachable forwardly disposed implement and comprising: a horizontal, generally right triangular rigid main frame including a transverse forward portion, a fore-and-aft portion along one side of the frame and a hypotenuse portion extending obliquely relative to the direction of travel between the rearward end of the fore-and-aft portion and the forward portion; a pair of forward transversely spaced drive wheels respectively journaled on the frame adjacent the opposite ends of the forward portion for supporting the forward end of the frame above the ground; an operator's station supported on the frame generally above the forward portion of the frame; an internal combustion engine mounted on the frame rearwardly of the operator's station; first and second similar, vertical pivot members; means rigidly connecting the first pivot member to the frame at the rearward end of the fore-and-aft frame portion and the second pivot member to the hypotenuse portion of the frame on approximately the fore-and-aft center line of the unit; a caster wheel structure including a caster wheel and a vertical pivot element alternately mountable on and cooperative with the first or second pivot member for alternately pivotally connecting the caster wheel structure to the frame in an operating position wherein the caster wheel trails one of the drive wheels or in a transport position wherein the caster wheel is disposed on approximately the fore-and-aft center line of the unit; and locking means operative between the alternate pivot member and the caster wheel structure pivot element to releasably lock the caster wheel structure to the frame in either of its alternate positions.

2. The invention defined in claim 1 wherein the vertical pivot members comprise axially vertical tubular members and the caster wheel pivot element comprises a vertical shaft insertable into and rotatable within either of the tubular members.

(References on following page)

References Cited

UNITED STATES PATENTS

| | | | |
|---|---|---|---|
| 1,321,258 | 11/1919 | Stinson | 180—27 |
| 1,358,997 | 11/1920 | Springer | 180—6.66 |
| 2,608,883 | 9/1952 | Luebben | 180—6.2 X |
| 2,677,225 | 5/1954 | Ommodt | 56—192 X |
| 2,763,116 | 9/1956 | Flinchbaugh et al. | 280—34 X |
| 3,151,429 | 10/1964 | Dyrdahl | 56—23 |
| 3,279,158 | 10/1966 | Kirkpatrick et al. | 56—228 |

KENNETH H. BETTS, Primary Examiner

U.S. Cl. X.R.

56—322